Feb. 6, 1940.  G. A. MORTON  2,189,319
ELECTRO-OPTICAL DEVICE
Filed Nov. 30, 1935
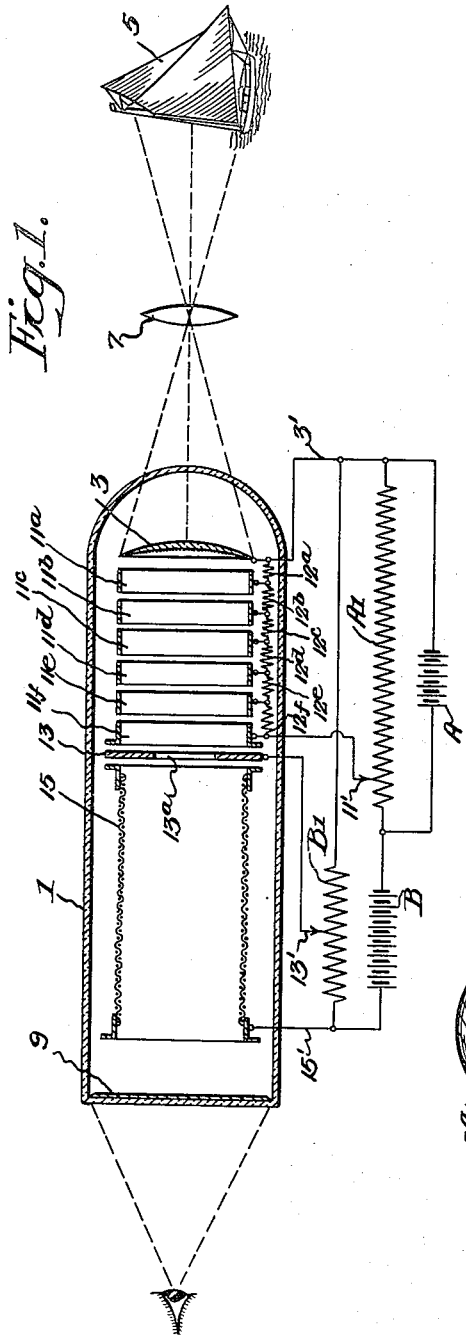
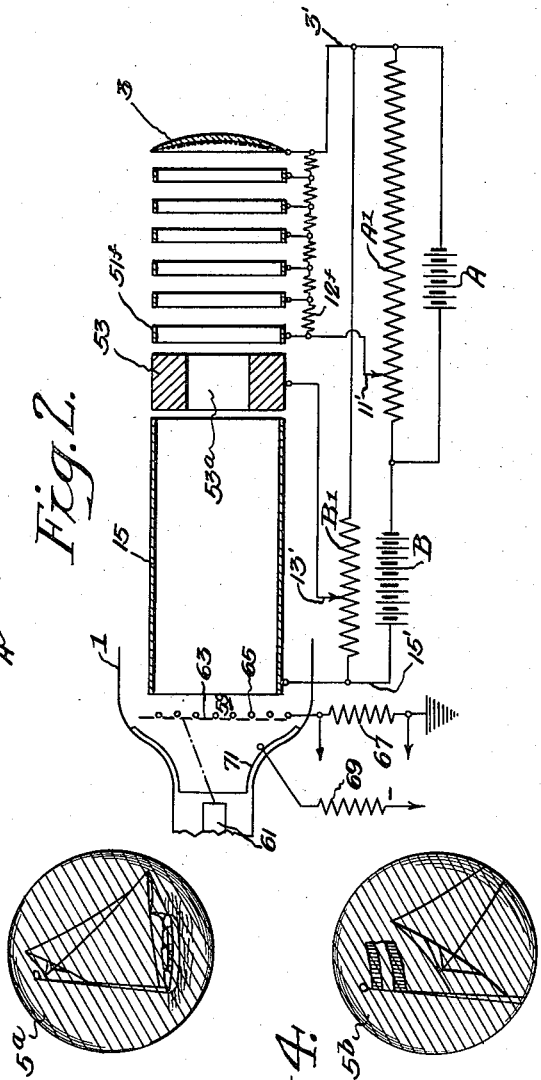
Inventor
George A. Morton
by S. R. Goldsborough
Attorney Patented Feb. 6, 1940

2,189,319

UNITED STATES PATENT OFFICE 2,189,319

ELECTRO-OPTICAL DEVICE

George A. Morton, Haddon Heights, N. J., assignor to Radio Corporation of America, a corporation of Delaware Application November 30, 1935, Serial No. 52,289

11 Claims. (Cl. 250—153)

This invention relates to electro-optical devices and particularly to improvements in electron-lens systems for electron-telescopes and the like.

It is known to those skilled in the art to which this invention appertains that electron trajectories may be altered by subjecting the electrons in their passage to the influence of electrostatic and/or electromagnetic fields. This phenomenon has been utilized, for example, in electron-telescopes to focus the several families or "bundles" of electrons so they will impinge upon suitable terminal or target electrodes without substantial numerical diminution. If means are provided to control the configuration of the electric field the sharpness of the focus may be altered.

While, as above indicated, it is entirely practical to variably or permanently focus an electron image in a manner similar to that achieved in optics with ordinary lens systems, known electron-lenses suffer the disadvantage that, once assembled, they are incapable of such adjustment as will produce undistorted electron-images of various desired degrees of magnification.

It is therefore an object of this invention to provide means for altering the magnification of an electron-image.

Another object of the invention is to provide an electron-lens capable of producing electron-images of various degrees of magnification and demagnification, without distortion.

Other objects will be apparent and the invention itself both as to its organization and method of operation will be best understood by reference to the following specification and to the accompanying drawing, wherein:

Figure 1 is a view, partly diagrammatic and partly pictorial, of an electron-telescope embodying an electron-lens system within the invention;

Fig. 2 is a diagrammatic representation of another embodiment of the invention;

Figs. 3 and 4 are end views looking in the direction of the eye of Fig. 1 exemplifying the appearance of an electron image upon the fluorescent screen with different electrical adjustments of the electron-lens.

In Fig. 1 a lens system within the invention is shown as applied to an electron-telescope contained in a preferably highly evacuated container 1. A semi-transparent photosensitive cathode 3, curved to correct for curvature of the image field and for so-called "pin-cushion" distortion is disposed adjacent the leading end of the tube 1. A preferably inverted optical image of an object 5 is focused upon this curved photosensitive cathode 3 by means of a suitable lens system exemplified in the drawing by the single lens 7. Such lens system may be constructed of optical glass if the device 1 is to be used for examining visible images, or of quartz if ultra-violet light from an object is to be utilized, or of hard rubber or the like if use is to be made of infra-red light.

Disposed adjacent to, or, as shown in Fig. 1, forming part of, the opposite end of the tube 1 is a semi-transparent fluorescent screen 9 upon which electrons from cathode 3 eventually impinge to form an externally visible, re-inverted image 5a Fig. 3, 5b Fig. 4.

The electrode elements which, together with the previously described cathode 3, constitute the structure of an electron-lens capable of variable magnification are designated 11a, 11b, 11c, 11d, 11e, 11f, 13 and 15. They are preferably symmetrically arranged in the order shown about the long axis of symmetry of the container 1 so that they form a multi-part conduit between the terminal surfaces 3 and 9. Apertured members 11 are the focusing electrodes and serve to direct the electrons toward the reduced aperture 13a of electrode 13. The "electron-center" of the lens, i. e., the point where the electrons cross to eventually form a reinverted electron-image upon screen 9, is adjacent the reduced orifice 13a of electrode 13. It is by electrically shifting the position of this electron-center and/or changing the trajections of the electrons on one or both sides of this center that variable magnification is achieved.

The focusing electrodes may conveniently be ring-like members similar to those designated 51 in Fig. 2; preferably, however, they are in the form of short cylinders 11, Fig. 1, as with such construction the cylinder walls serve to effectively shield the inner wall of the tube 1 from electrostatic charges.

The magnifying electrode 13 as shown in Fig. 1 is a disc-like member, it may, however, be a thick-walled cylinder similar to that designated 53 in Fig. 2. The diameter of the orifice in either event is preferably, but in the case of electrode 53, not necessarily, substantially less than that of the several focusing members 11 and of the anode 15. Apertures 13a, or 53a, may, for instance, be substantially one-half that of the other electrodes, its lower limit being determined by the ability to direct the electrons therethrough without impinging against the surrounding metal. The anode or accelerating electrode 15 is in the form of an elongated open-ended cylinder formed either of solid metal or of a foraminous metallic sheet. The relative potential distribution among all of the focusing electrodes 11, Fig. 1, 51, Fig. 2, is the same regardless of the magnification required so that, if desired, individual resistors 12a—12f, may be permanently connected within the tube, for instance, in the manner shown in copending application, Serial No. 48,982, to Zworykin et al., filed October 30, 1935, and now U. S. patent numbered 2,078,304 issued April 27, 1937. These resistors are of such value as to supply the several electrodes 11, or 51, with separate potentials each of increased magnitude with respect to its next preceding electrode.

With the resistors 12 included within the tube, but four external leads are required. These leads are connected to a suitable source of current exemplified in the drawing by the series connected batteries A and B and by the potential dividers A1 and B1. The cathode 3 is preferably connected to the negative terminal and the anode 15 to the positive terminal of the direct current source by leads 3' and 15' respectively. The magnifying electrode 13 is energized through lead 13' adjustably connected to a point on B1 equal to or less positive than the point to which the anode is connected. Adjustable lead 11' supplies operating potentials for all of the electrodes 11; the necessary distribution obtaining by reason of the resistors 12 previously described.

Alternating, instead of direct, current may be employed if desired, provided the alternations are at a rate sufficient to ensure persistance of vision.

Magnification is determined by the potential applied to the focusing electrode 11f, Fig. 1; 51f, Fig. 2 and the potential applied to electrode 13, Fig. 1; 53, Fig. 2. The preferred method of operating the device of Figs. 1 and 2 is to set 13' at the potential giving the desired magnification and adjusting 11' until the image is sharp. The magnification is increased by making the magnifying electrode 13 or 53, electrically more positive and decreased by making it less positive with respect to that applied to the terminal focusing electrode 11f or 51f. This serves to alter the contour of the lines of force constituting the electrostatic field and to shift the crossing-point or electron-center of the lens system. Thus the system may be adjusted to achieve various degrees of magnification as indicated by the full image 5a appearing on the screen 9 of Fig. 3 and the "close-up" 5b on this screen 9 in Fig. 4.

While the use of a curved semi-transparent cathode permits of compactness of design and economy of parts it is to be understood that the invention is not to be limited to the particular type of cathode shown. Obviously, this electrode may be so positioned that the light image will impinge upon its inner-surface, in which case it need not be formed of transparent material. Again, it need not be a "primary-electron" emitter but may conveniently be a "secondary-electron" emitter treated in any known manner to increase the ratio of secondary-to-primary electrons.

Where the electron image is to be directly viewed, as in Fig. 1, the screen 9 may conveniently be a layer of willemite or other well known material which fluoresces under electron impact. If it is desired to televise the image, the fluorescent screen 9 may be dispensed with and the image either directly scanned, for example, as shown in Farnsworth Patent No. 1,773,980, or it may be thrown upon a planar mosaic electrode 59, as shown in Fig. 2, which in turn is scanned by a cathode ray from an electron gun 61 (details not shown) to provide a train of electrical impulses. The mosaic electrode is exemplified, in Fig. 2, by a reticulated element 63 in each opening of which is disposed a metallic particle 65. The particles are insulated from the reticulated element and are accessible to the electron image on the one side and to the moving cathode ray on the other. The output signal may appear across a resistor 67 connected to the reticulated element or a resistor 69 connected to a metallic coating 71, or the like, on the gun side of the screen. The ray deflecting coils, or plates are omitted from the drawing since they are well known.

While the electron-lens of the invention has been described as applied to a typical electro-optical device, it is to be understood that the invention is not to be limited to such application as its embodiment is, in this respect, merely illustrative for purposes of explaining the invention concept.

What is claimed is:

1. In an electro-optical system, means for forming an electron-image corresponding to a light image in a plane spaced from the light image, means for altering the magnification in said plane of said electron-image and means for changing the focus of said altered electron image.

2. A system in accordance with claim 1 wherein means are provided for preventing distortion of said electron-image due to alteration in the magnification thereof.

3. In an electro-optical system, a photo-sensitive cathode adapted to release a family of electrons in response to the impression thereon of a light image, a screen, means for so directing said electrons that their paths will cross at a point intermediate said cathode and screen to form a focused inverted electron image on said screen corresponding to said light image, and means for electrically altering the trajectories of said electrons to change the magnification and focus of said electron image.

4. In an electro-optical system, a photo-sensitive cathode adapted to release a family of electrons in response to the impression thereon of a light image, a screen, means for so directing said electrons that their paths will cross at a point intermediate said cathode and screen to form an inverted electron image on said screen corresponding to said light image, and means for electrically shifting said electron crossing-point whereby the magnification and focus of said electron image is altered.

5. The invention as set forth in claim 3 wherein said cathode is curved to obviate distortion due to changes in the magnification of said electron image.

6. In an electro-optical system, a photo-sensitive cathode adapted to release a family of electrons in response to the impression thereon of a light image, a screen, a conduit intermediate said cathode and screen through which said electrons pass, said conduit comprising a plurality of apertured members, at least one of said members having an opening of a diameter less than that of the other of said members, means for impressing suitable operating potentials upon said electrode members to produce an electron image upon said screen corresponding to said light image, and means for adjusting the potential applied to said one of said members to alter the magnification of said image.

7. The invention as set forth in claim 6 wherein certain of said members are of ring-like construction and another of said members is in the form of a hollow cylinder.

8. The invention as set forth in claim 6 wherein two of said apertured members are in the form of hollow cylinders, one of said cylinders being longer than the other.

9. The invention as set forth in claim 6 wherein said conduit comprises a plurality of similar ring-like electrodes, a cylindrical member having an aperture of reduced diameter, and a cylindrical member having an aperture of a diameter similar to that of said ring-like members, said members being arranged in the order named intermediate said cathode and screen.

10. In an electro-optical system, a photosensitive cathode adapted to release a family of electrons in response to the impression thereon of a light image, a screen, a conduit intermediate said cathode and screen through which said electrons pass, said conduit comprising a plurality of series connected apertured electrodes, each adapted to be maintained at a potential relatively higher than that of its next preceding member in the cathode direction, an electrode having an orifice of a diameter less than that of the apertures in said first mentioned electrodes mounted adjacent the electrode furthest removed from said cathode, a tubular anode mounted intermediate said screen and said orificed electrode, means for impressing suitable operating potentials upon said electrodes to produce an electron image upon said screen corresponding to said light image, means for uniformly varying the potentials applied to said series connected apertured members to adjust the focus of said electron image, and means for adjusting the potential applied to said orificed electrode to alter the magnification of said image.

11. An electro-optical system comprising means for forming an optical image, means for forming an electrical image corresponding to said optical image, means for focusing said electrical image in a plane spaced from said optical image and means for altering the magnification and focus in said plane, of said electrical image.

GEORGE A. MORTON.